United States Patent
Yang

(10) Patent No.: US 11,683,745 B2
(45) Date of Patent: *Jun. 20, 2023

(54) WIRELESS COMMUNICATION METHOD AND TERMINAL DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 1 day.

This patent is subject to a terminal disclaimer.

(21) Appl. No.: 17/235,552

(22) Filed: Apr. 20, 2021

(65) Prior Publication Data

US 2021/0243682 A1    Aug. 5, 2021

Related U.S. Application Data

(63) Continuation of application No. 15/931,227, filed on May 13, 2020, now Pat. No. 11,006,351, which is a continuation of application No. PCT/CN2017/111184, filed on Nov. 15, 2017.

(51) Int. Cl.
*H04W 48/16* (2009.01)
*H04W 48/20* (2009.01)

(52) U.S. Cl.
CPC .......... *H04W 48/16* (2013.01); *H04W 48/20* (2013.01)

(58) Field of Classification Search
CPC .............................. H04W 48/16; H04W 48/20

USPC ....... 455/434, 422.1, 418, 436, 432.1, 414.1
See application file for complete search history.

(56) References Cited

U.S. PATENT DOCUMENTS

| | | | |
|---|---|---|---|
| 9,883,451 B2 | 1/2018 | Gonsalves et al. | |
| 10,039,014 B2 * | 7/2018 | Lee | H04L 5/0048 |
| 11,006,351 B2 * | 5/2021 | Yang | H04W 48/16 |
| 2011/0243099 A1 | 10/2011 | Chin | |
| 2012/0046034 A1 | 2/2012 | Lu | |
| 2012/0289183 A1 * | 11/2012 | Tiwari | H04W 76/50 |
| | | | 455/404.1 |
| 2016/0337957 A1 | 11/2016 | Gonsalves et al. | |

(Continued)

FOREIGN PATENT DOCUMENTS

| | | |
|---|---|---|
| CN | 102088756 A | 6/2011 |
| CN | 102273278 A | 12/2011 |

(Continued)

OTHER PUBLICATIONS

First Office Action of the Taiwanese application No. 107140360, dated Nov. 19, 2021. 11 pages with English translation.

(Continued)

*Primary Examiner* — Nghi H Ly
(74) *Attorney, Agent, or Firm* — Perkins Coie LLP

(57) ABSTRACT

Implementations of this disclosure provide a wireless communication method performed by a terminal device, to properly select a cell, avoid a problem that communication cannot be performed due to improper cell selection, and support a relatively flexible communication scenario. The method includes: selecting a first cell according to a first core network type to which a connection is required, where the first cell is a cell supporting the first core network type; and performing cell access through the first cell.

20 Claims, 2 Drawing Sheets

(56) References Cited

U.S. PATENT DOCUMENTS

2017/0223555 A1 8/2017 Lee et al.
2019/0110243 A1 4/2019 Chun et al.

FOREIGN PATENT DOCUMENTS

| | | |
|---|---|---|
| CN | 102780988 A | 11/2012 |
| CN | 106332222 A | 1/2017 |
| CN | 106465258 A | 2/2017 |
| CN | 106470460 A | 3/2017 |
| EP | 2421302 A1 | 2/2012 |
| EP | 3338485 A1 | 6/2018 |
| EP | 3439367 A1 | 2/2019 |
| RU | 2574816 C2 | 2/2016 |
| RU | 2606962 C2 | 1/2017 |
| WO | 2016182669 A1 | 11/2016 |
| WO | 2017039952 A1 | 3/2017 |
| WO | 2017171427 A1 | 10/2017 |

OTHER PUBLICATIONS

Second Office Action of the Chinese application No. 202010251755.4, dated Dec. 2, 2021. 18 pages with English translation.
First Office Action of the Russian application No. 2020118159, dated Dec. 14, 2020.
Vivo: "CN selection for LTE connected to 5GC", 3GPP Draft; R2-1710950 CN Selection for LTE Connected To 5GC. 3rd Generation Partnership Project (3GPP), Mobile Competence Centre ; 650, Route Des Lucioles; F-06921 Sophia-Antipolis Cedex; France, vol. RAN WG2, No. Prague, Czech Republic; 20171009-20171013, Oct. 8, 2017 (Oct. 8, 2017), XP051342962, Retrieved from the Internet: URL: http://www.3gpp. org/ftp/Meetings_3GPP_SYNC/RAN2/Docs/[ retrieved on Oct. 8, 2017]* the whole document *.
Ericsson: "CN selection when accessing" 3GPP Draft; R2-1707796-CN Selection When Accessing. 3rd Generation Partnership Project (3GPP), Mobile Competence Centre 650, Route Des Lucioles; F-06921 Sophia-Anti Polis Cedex; France, vol. RAN WG2, No. Berlin, Germany; 20170821-20170825, Aug. 20, 2017 (Aug. 20, 2017), XP051317756, Retrieved from the Internet: URL: http://www.3gpp. org/ftp/Meetings_3GPP SYNC/RAN2/Docs/[ retrieved on Aug. 20, 2017]* the whole document *.
ZTE et al: "Multi-PLMN aspects of E-UTRA cell connected to 5GC" 3GPP Draft; R2-1710420 Multi-PLMN Aspects of E-UTRA Cell Connected to 5GC, 3rd Generation Partnership Project (3GPP) Mobile Competence Centre; 650, Route Des Lucioles; F-06921 Sophia-Antipolis Cedex, vol. RAN WG2, No. Prague, Czech; 20171009-20171013, Oct. 8, 2017 (Oct. 8, 2017), XP051342465, [ retrieved on Oct. 8, 2017]* the whole document *.

Supplementary European Search Report in the European application No. 17931895.1, dated Oct. 5, 2020.
International Search Report in the international application No. PCT/CN2017/111184, dated Aug. 1, 2018.
Written Opinion of the International Search Authority in the international application No. PCT/CN2017/111184, dated Aug. 1, 2018.
Huawei, HiSilicon "Discussion on mobility scenario for E-UTRA connected to 5GC" 3GPP TSG-RAN WG2 Meeting #99bis R2-1711112 Prague, Czech Republic, Oct. 9-13, 2017.
Samsung "Further considerations on the CN selection for E-UTRAN connected to 5G CN" 3GPP TSG-RAN WG2 Meeting #99bis R2-1710789 Prague, Czech, Oct. 9-13, 2017.
CATT "Further Consideration for CN selection" 3GPP TSG-RAN WG2 Meeting #99bis R2-1710305 Prague, Czech Republic, Oct. 9-13, 2017.
Huawei, HiSilicon "Handling on E-UTRA cell where some PLMNs only have access to 5GC" 3GPP TSG-RAN WG2 Meeting #99bis R2-1711109 Prague, Czech Republic, Oct. 9-13, 2017.
First Office Action of the U.S. Appl. No. 15/931,227, dated Aug. 24, 2020.
Notice of Allowance of the U.S. Appl. No. 15/931,227, dated Jan. 21, 2021.
Supplementary Notice of Allowance of the U.S. Appl. No. 15/931,227, dated Mar. 12, 2021.
Office Action of the Indian application No. 202017024828, dated Jul. 14, 2021. 6 pages.
First Office Action of the Canadian application No. 3082914, dated Aug. 11, 2021. 5 pages.
First Office Action of the Korean application No. 10-2020-7015082, dated Aug. 19, 2021. 9 pages with English translation.
Huawei, HiSilicon, Assistant information to perform CN selection [online], 3GPP TSG RAN WG2 #99bis R2-1711114, Sep. 29, 2017. 3 pages.
Oppo, Further Discussion on UE Preference and CN Selection [online], 3GPP TSG RAN WG2 #99bis R2-1710182, Internet<URL: http://www. 3gpp.org/ftptsg.ran/WG2_RL2/TSGR2_99bis/Docs/R2-1710182.zip>, Sep. 28, 2017. 2 pages.
Huawei, Hisilicon, Introduction of relaxed monitoring for NB-IoT in 36.304 [online], 3GPP TSG RAN WG2 # 99bis R2-1711321, Sep. 28, 2017. 9 pages.
Oppo, Clarification on NAS and AS Function Division for CN Type Selection [online], 3GPP TSG RAN WG2 #100 R2-1712217, Nov. 17, 2017. 3 pages.
First Office Action of the Japanese application No. 2020-526591, dated Oct. 1, 2021. 10 pages with English translation.
First Office Action of the Chinese application No. 202010251755.4, dated Oct. 8, 2021. 17 pages with English translation.
Decision of Rejection of the Japanese application No. 2020-526591, dated May 20, 2022. 8 pages with English Translation.

* cited by examiner

WIRELESS COMMUNICATION METHOD AND TERMINAL DEVICE

CROSS-REFERENCE TO RELATED APPLICATION

This application is a continuation application of U.S. patent application Ser. No. 15/931,227, filed on May 13, 2020, entitled "WIRELESS COMMUNICATION METHOD AND DEVICE", which is a continuation application of PCT Patent Application No. PCT/CN2017/111184, entitled "WIRELESS COMMUNICATION METHOD AND DEVICE" filed on Nov. 15, 2017, contents of which are incorporated by reference in their entirety for all purpose.

RELATED ART

In a long term evolution system, a terminal device may first select a public land mobile network (PLMN), and select, from cells within the PLMN, a cell performing access, so as to perform cell access.

With development of communications, a flexibility requirement for communications is increasingly high.

How to match relatively high communications flexibility in an aspect of cell access is one problem to be resolved urgently.

SUMMARY

This disclosure relates to the field of communications, and more specifically, to a wireless communication method and a device.

Implementations of this disclosure provide a wireless communication method and a device, to properly select a cell.

A first aspect provides a wireless communication method performed by a terminal device, including: selecting a first cell according to a first core network type of a core network on which a connection needs to be performed, where the first cell is a cell supporting the first core network type; and performing cell access through the first cell.

A second aspect provides a terminal device, configured to perform the method in the foregoing first aspect or any possible implementation of the first aspect. Specifically, the terminal device includes functional modules configured to perform the method in the foregoing first aspect or any possible implementation of the first aspect.

A third aspect provides a terminal device, including a processor, a memory, and a transceiver. The processor, the memory, and the transceiver communicate with each other through an internal connection path, to transfer at least one of a control signal or a data signal, to enable the terminal device to perform the method in the first aspect or any possible implementation of the first aspect.

A fourth aspect provides a computer readable medium, configured to store a computer program, where the computer program includes an instruction used to perform the method in any one of the foregoing aspects or any possible implementation.

A fifth aspect provides a computer program product including an instruction, and when the computer program product is run on a computer, the computer is enabled to perform the method in any one of the foregoing aspects or any possible implementation.

BRIEF DESCRIPTION OF THE DRAWINGS

To describe the technical solutions in the implementations of this disclosure more clearly, the following briefly introduces the accompanying drawings for describing the implementations or the related art. Apparently, the accompanying drawings in the following description show merely some implementations of this disclosure, and a person of ordinary skill in the art may still derive other drawings from the accompanying drawings without creative efforts.

DETAILED DESCRIPTION

Figure 1:
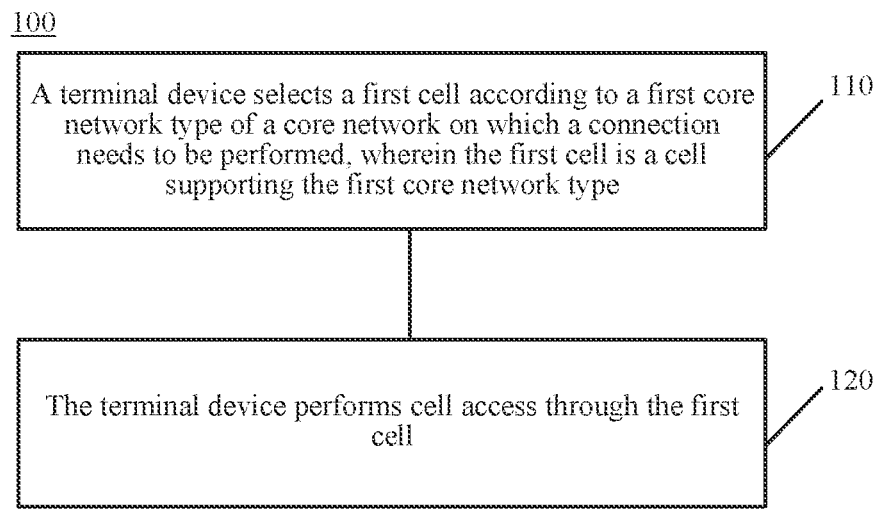
FIG. 1 is a schematic flowchart of a wireless communication method according to an implementation of this disclosure.

The following describes the technical solutions in the implementations of this disclosure with reference to the accompanying drawings in the implementations of this disclosure. Apparently, the described implementations are some implementations of this disclosure rather than all of the implementations. All other implementations obtained by a person of ordinary skill in the art based on the implementations of this disclosure without creative efforts shall fall within the protection scope of this disclosure.

The technical solutions of the implementations of this disclosure may be applied to various communications systems, for example, a long term evolution ("LTE" for short) system, an LTE frequency division duplex ("FDD" for short) system, an LTE time division duplex ("TDD" for short), a universal mobile telecommunications system ("UMTS" for short), an evolved LTE system, or a 5G system. The evolved LTE system is an enhanced LTE technology and system that uses an LTE air interface protocol on a wireless side but may access a 5G core network by enhancing a base station.

In at least one implementation, a terminal device in the implementations of this disclosure may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved PLMN or the like.

It should be understood that, terms "system" and "network" in this specification are usually interchangeably used in this specification. The term "and/or" in this specification is only an association relationship for describing the associated objects, and represents that three relationships may exist, for example. A and/or B may represent the following three cases: A exists separately, both A and B exist, and B exists separately. In addition, the character "/" in this specification generally indicates an "or" relationship between the associated objects.

With development of communications, a radio access network (RAN) based on LTE may have a capability of accessing two or more core networks at the same time, for example, may access an evolved packet core network (EPC) and a 5G core network (5GC) at the same time.

For example, the RAN in LTE may be upgraded, so that the RAN can access the EPC and the 5GC.

This disclosure provides a wireless communication method that may implement cell access for such a scenario.

It should be understood that, in the implementations of this disclosure, description is made at a plurality of places by using an example in which core network types are the EPC and the 5GC, but the implementations of this disclosure are not limited thereto. The core network types in the implementations of this disclosure may be a core network of a 3G network, an evolved core network of a 5G core network, and the like.

FIG. 1 is a schematic flowchart of a wireless communication method 100 according to an implementation of this disclosure. In at least one implementation, the method 100 may be performed by a terminal device. The method 100 includes at least a part of the following content.

In 110, a terminal device selects a first cell according to a first core network type of a core network on which a connection needs to be performed, wherein the first cell is a cell supporting the first core network type.

The first core network type may include at least one of an EPC or a 5GC, wherein when the first core network type includes the EPC and the 5GC, it means that the terminal device communicates with the EPC and the 5GC through the first cell.

In at least one implementation, the terminal device determines, at a non-access stratum (NAS) layer and according to a service type of a service that needs to be processed, that a core network type of a core network on which a connection needs to be performed is the first core network type.

The terminal device may select, according to a service type of a to-be-processed service, a core network type that can process the service of the service type.

If a plurality of to-be-processed services is included and needs to be processed respectively by the EPC and the 5GC, it may be determined that the first core network type includes the EPC and the 5GC, and therefore the selected first cell needs to support the EPC and the 5GC at the same time. If the to-be-processed service needs to be processed by only the EPC, it may be determined that the first core network type is the EPC, and therefore the selected first cell may support only the EPC, or support the EPC and the 5GC. If the to-be-processed service needs to be processed by only the 5GC, it may be determined that the first core network type is the 5GC, and therefore the selected first cell may support only the 5GC, or support the EPC and the 5GC. If the to-be-processed service may be processed by both the EPC and the 5GC, one of the EPC and the 5GC may be selected according to priorities. For example, it may be considered by default that a priority of the 5GC is higher.

In at least one implementation, the terminal may select a core network according to a non-access stratum (NAS) protocol capability of accessing the core network type that the terminal has. For example, if the NAS protocol capability supports an EPC NAS entity, the EPC may be selected, or the EPC and the 5GC may be selected; or if the NAS protocol capability supports a 5GC NAS entity, the 5GC may be selected, or the 5GC and the EPC may be selected.

In at least one implementations, when a service may be individually processed by a plurality of types of core networks respectively, a cell supporting one of the core network types may be selected, or a cell supporting the plurality of types of core networks may be selected.

The terminal device may start, at the NAS layer, an appropriate NAS entity, that is, the 5GC NAS entity or the EPC NAS entity according to a service requirement, thereby processing a corresponding service.

Therefore, in this implementation of this disclosure, a required core network type is selected and determined according to a service requirement, and a cell is selected based on this, so that the service requirement is satisfied.

It should be understood that, in this implementation of this disclosure, although the selecting the first cell according to the first core network type is described at a plurality of places, when a cell is selected in this implementation of this disclosure, another factor such as cell status information (for example, cell barred or cell reserved) or a measured signal quality measurement value used to perform cell selection may be further considered.

In at least one implementation, after obtaining the system information and the measurement information at the AS layer, the terminal device may submit the information to the access stratum (AS) layer.

In 120, the terminal device performs cell access through the first cell.

To more clearly understand this disclosure, several manners of selecting the first cell are introduced below.

In an implementation, the terminal device determines, at the NAS layer, at least one of a first public land mobile network (PLMN) or a first radio access technology (RAT) that is selected for access; and selects, at the AS layer, the first cell from searched-out cells corresponding to the at least one of the first PLMN or the first RAT according to a core network type supported by the searched-out cells corresponding to the first core network type and the at least one of the first PLMN or the first RAT.

Specifically, the terminal device may select, at the NAS layer, and indicate, to the AS layer, at least one of the first PLMN or the first RAT that currently requires access, and determine, at the AS layer, a cell capable of supporting the first core network type in cells corresponding to at least one of the first PLMN or the first RAT.

After receiving the indication of the NAS layer, the AS layer may perform cell search. Specifically, the AS layer searches out the cells corresponding to at least one of the first PLMN or the first RAT, and selects a cell supporting the first core network type from the searched-out cells.

After receiving the indication of the NAS layer, the AS layer may alternatively not perform cell search, but select the first cell by directly using stored cell information, where the stored cell information may be obtained by performing cell search at a stage of maintaining a PLMN list.

In at least one implementation, cell search in this implementation of this disclosure may include at least one of cell synchronization or measurement.

In at least one implementation, in this implementation of this disclosure, during cell search, the terminal device may submit the information obtained at the AS layer to the NAS layer.

In at least one implementation, in this implementation of this disclosure, interaction between the NAS layer and the AS layer may be implemented through primitives of the NAS layer and the AS layer.

In at least one implementation, the core network types supported by the searched-out cells are obtained at the AS layer and from the system information of the searched-out cells.

Specifically, when performing cell search at the AS layer, the terminal device detects the system information, so as to obtain a core network type supported by at least one of a corresponding cell or a cell status.

In an implementation, the terminal device selects, at the NAS layer and according to the first core network type, a second PLMN capable of supporting the first core network type and indicates the second PLMN to the AS layer; and selects, at the AS layer, the first cell from searched-out cells corresponding to the second PLMN.

Specifically, the terminal device may directly select, at the NAS layer, the second PLMN supporting the first core network type, and select the first cell from the searched-out cells corresponding to the second PLMN. If the first core network type is the 5GC, the second PLMN may support only the 5GC, or may support the 5GC and the EPC. If the first core network type is the EPC, the second PLMN may support only the EPC, or may support the 5GC and the EPC. If the first core network type includes the EPC and the 5GC, the second PLMN may support the EPC and the 5GC.

Specifically, the terminal device may select, at the NAS layer, and indicate, to the AS layer, the second PLMN that currently requires access, and determine, at the AS layer, a cell capable of supporting the first core network type in cells corresponding to the second PLMN.

After receiving the indication of the NAS layer, the AS layer may perform cell search. Specifically, the AS layer searches out the cells corresponding to the second PLMN, and selects a cell supporting the first core network type from the searched-out cells.

In the implementation of this disclosure, during cell search, the terminal device may submit the information obtained at the AS layer to the NAS layer.

After receiving the indication of the NAS layer, the AS layer may alternatively not perform cell search, but select the first cell by directly using stored cell information, where the stored cell information may be obtained by performing cell search at a stage of maintaining a PLMN list.

In at least one implementation, the terminal device obtains, at the AS layer and from the system information of the searched-out cells, the core network type supported by the searched-out cells.

Specifically, when performing cell search at the AS layer, the terminal device detects the system information, so as to obtain a core network type supported by at least one of a corresponding cell or a cell status.

In at least one implementation, the terminal device selects, at the AS layer, the first cell from the searched-out cells corresponding to the second PLMN according to a core network type supported by the searched-out cells corresponding to the second PLMN, and the first core network type.

Specifically, if the second PLMN supports the first core network type, that is, some cells of the second PLMN may support the core network type, a cell supporting the first core network type may be selected from the cells corresponding to the second PLMN.

Certainly, if the second PLMN supports the first core network type, all cells of the second PLMN may alternatively support the first core network type.

In at least one implementation, the terminal device obtains, at the AS layer and from the system information of the searched-out cells, the core network type supported by the searched-out cells.

In at least one implementation, the second PLMN is selected at the NAS layer and according to a PLMN list, where the PLMN list indicates a core network type supported by each PLMN.

Specifically, the terminal device may maintain a PLMN list, and the PLMN list may indicate a core network type supported by each PLMN, where in addition to indicating a core network type supported by each PLMN, the PLMN list may also indicate status information of a cell corresponding to each PLMN, an associated RAT, or the like.

When the second PLMN is selected from the PLMN list, the second PLMN may be selected from PLMNs supporting the first core network type, where when the second PLMN is selected, cell status information or the like may be further considered at the same time.

In at least one implementation, the terminal device may perform cell search at the AS layer, and determine PLMNs corresponding to searched-out cells, and core network types supported by the PLMNs corresponding to the searched-out cells; and generate, at the NAS layer, the PLMN list according to the PLMNs corresponding to the searched-out cells, and the core network types supported by the PLMNs corresponding to the searched-out cells.

In at least one implementation, in this implementation of this disclosure, during cell search, the terminal device may submit the information obtained at the AS layer to the NAS layer.

In at least one implementation, the terminal device obtains, at the AS layer and from the system information of the searched-out cells, the PLMNs corresponding to the searched-out cells, and the core network types supported by the PLMNs corresponding to the searched-out cells.

When PLMN search is performed, PLMN search may be performed according to a core network type. For example, a PLMN supporting the first core network type is searched out.

In at least one implementation, when one PLMN supports two or more core network types, the core network types may be sorted for the PLMN in the PLMN list. If a core network type is used as a core network type that has a low priority and that is supported by the PLMN, when a core network of the core network type needs to perform service processing, the PLMN may also be used as an optional PLMN having a low priority.

Therefore, in this implementation of this disclosure, a terminal device selects a first cell according to a first core network type of a core network on which a connection needs to be performed, where the first cell is a cell supporting the first core network type; and performs cell access through the first cell, to select a cell supporting a required core network type, properly select a cell, avoid a problem that communication cannot be performed due to improper cell selection, and support a relatively flexible communication scenario. For example, one cell may support a plurality of core network types.

Figure 2:
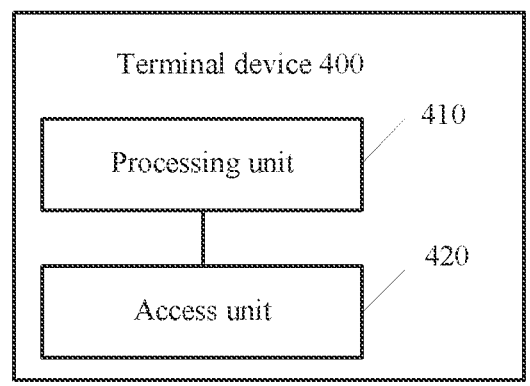
FIG. 2 is a schematic block diagram of a terminal device according to an implementation of this disclosure.

FIG. 2 is a schematic block diagram of a terminal device 400 according to an implementation of this disclosure. As shown in FIG. 2, the terminal device 400 includes a processing unit 410 and a communications unit 420. The processing unit 410 is configured to select a first cell according to a first core network type of a core network on which a connection needs to be performed, wherein the first cell is a cell supporting the first core network type; and the access unit 420 is configured to perform cell access through the first cell.

In at least one implementation, the processing unit 410 is further configured to:

determine, at a non-access stratum (NAS) layer and according to a service type of a service that needs to be processed, that a core network type of a core network on which a connection needs to be performed is the first core network type.

In at least one implementation, the processing unit 410 is further configured to:

determine, at the NAS layer, and indicating, to an AS layer, at least one of a first public land mobile network (PLMN) or a first radio access technology (RAT) that is selected for access; and selecting, at the AS layer, the first cell from searched-out cells corresponding to the at least one of the first PLMN or the first RAT according to a core network type supported by the searched-out cells corresponding to the first core network type and the at least one of the first PLMN or the first RAT.

In at least one implementation, the processing unit 410 is further configured to:

obtain, at the AS layer and from system information of the searched-out cells, the core network type supported by the searched-out cells, and transfer the obtained information to the NAS layer.

In at least one implementation, the processing unit 410 is further configured to:

select, at the NAS layer and according to the first core network type, and indicating, to the AS layer, a second PLMN capable of supporting the first core network type; and select, at the AS layer, the first cell from searched-out cells corresponding to the second PLMN.

In at least one implementation, the processing unit 410 is further configured to:

select, at the AS layer, the first cell from the searched-out cells corresponding to the second PLMN according to a core network type supported by the searched-out cells corresponding to the second PLMN, and the first core network type.

In at least one implementation, the processing unit 410 is further configured to:

obtain, at the AS layer and from system information of the searched-out cells, the core network type supported by the searched-out cells, and transfer the obtained information to the NAS layer.

In at least one implementation, the processing unit 410 is further configured to:

select, at the NAS layer and according to a PLMN list, and indicating, to the AS layer, the second PLMN, wherein the PLMN list indicates a core network type supported by each PLMN.

In at least one implementation, the processing unit 410 is further configured to:

perform cell search at the AS layer, determining PLMNs corresponding to searched-out cells, and core network types supported by the PLMNs corresponding to the searched-out cells, and transfer the searched-out information to the NAS layer; and generate, at the NAS layer, the PLMN list according to the PLMNs corresponding to the searched-out cells, and the core network types supported by the PLMNs corresponding to the searched-out cells.

In at least one implementation, the processing unit 410 is further configured to:

obtain, at the AS layer and from the system information of the searched-out cells, the PLMNs corresponding to the searched-out cells, and the core network types supported by the PLMNs corresponding to the searched-out cells.

In at least one implementation, the first type includes at least one of an evolved packet core network (EPC) or a 5G core network (5GC).

It should be understood that, the terminal device 400 may correspond to the terminal device in the method implementation, and may implement corresponding operations implemented by the terminal device in the method implementation. For brevity, details are not described herein again.

Figure 3:
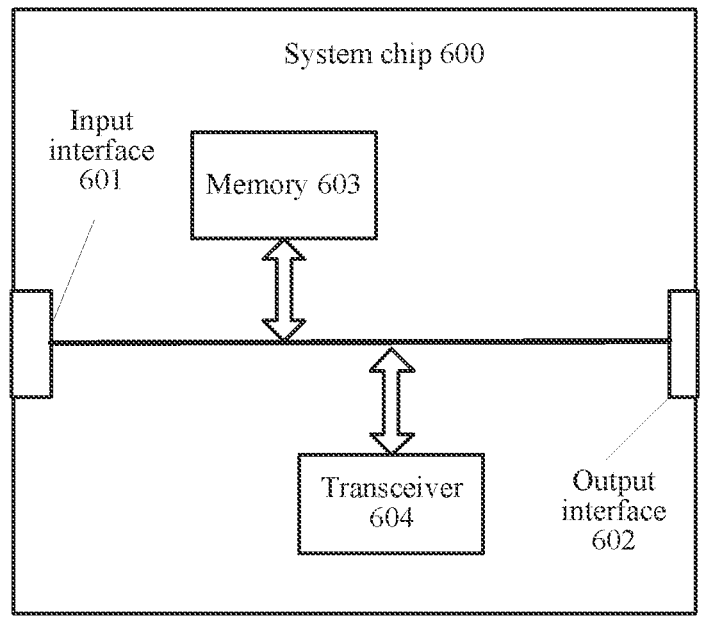
FIG. 3 is a schematic block diagram of a system chip according to an implementation of this disclosure.

FIG. 3 is a schematic structural diagram of a system chip 600 according to an implementation of this disclosure. The system chip 600 in FIG. 3 includes an input interface 601, an output interface 602, a processor 603 and a memory 604 that may be connected to each other by using an internal communications connection line, and the processor 603 is configured to execute code in the memory 604.

In at least one implementation, when the code is executed, the processor 603 implements the method performed by the terminal device in the method implementation. For brevity, details are not described herein again.

Figure 4:
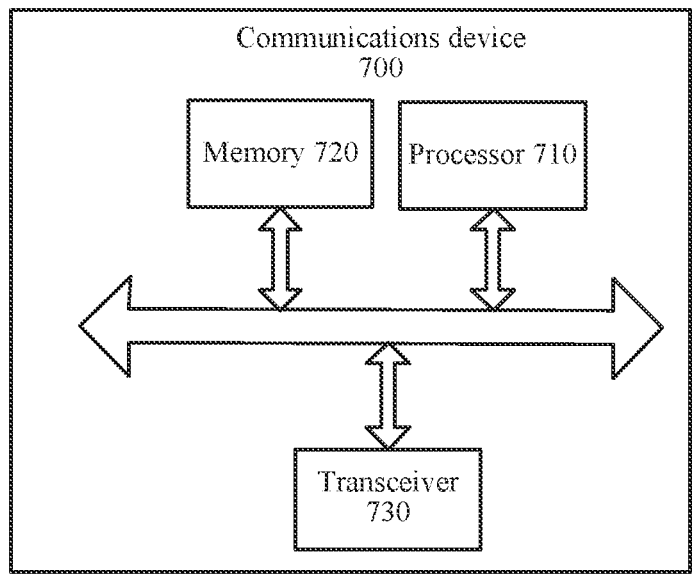
FIG. 4 is a schematic block diagram of a communications device according to an implementation of this disclosure.

FIG. 4 is a schematic block diagram of a communications device 700 according to an implementation of this disclosure. As shown in FIG. 4, the communications device 700 includes a processor 710 and a memory 720. The memory 720 may store program code, and the processor 710 may execute the program code stored in the memory 720.

In at least one implementation, as shown in FIG. 4, the communications device 700 may include a transceiver 730, and the processor 710 may control the transceiver 730 to communicate with the outside.

In at least one implementation, the processor 710 may invoke program code stored in the memory 720, to perform corresponding operations of the terminal device in the method implementation. For brevity, details are not described herein again.

It should be understood that, the processor of this implementation of this disclosure may be an integrated circuit chip, and has a signal processing capability. During implementation, the steps of the foregoing method implementation may be implemented by using a hardware integrated logic circuit in the processor or implemented by using an instruction in a software form. The foregoing processor may be a general purpose processor, a digital signal processor (DSP), an application-specific integrated circuit (ASIC), a field programmable gate array (FPGA), or another programmable logical device, discrete gate or transistor logical device, or discrete hardware component. The processor may implement or perform methods, steps and logical block diagrams disclosed in the implementations of this disclosure. The general purpose processor may be a microprocessor or the processor may be any conventional processor and the like. Steps of the methods disclosed with reference to the implementations of this disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It can be understood that, the memory in the implementations of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct Rambus random access memory (DR RAM). It should be noted that, the memory for the system and the method described herein aims to include but not limited to these memories and any other suitable types of memories.

A person of ordinary skill in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method implementations, and details are not described herein again.

In the several implementations provided in this disclosure, it should be understood that the disclosed system, apparatus, and method may be implemented in other manners. For example, the described apparatus implementation is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the implementations.

In addition, functional units in the implementations of this disclosure may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this disclosure essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the implementation of this disclosure. The foregoing storage medium includes: any medium that can store program codes, such as a USB flash disk, a removable hard disk, a read-only memory (ROM), a random access memory (RAM), a magnetic disk, or an optical disk.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

The invention claimed is:

1. A wireless communication method performed by a terminal device, comprising:
    selecting a first cell according to a first core network type of a core network on which a connection needs to be performed, wherein the first cell is a cell supporting the first core network type; and
    performing cell access through the first cell;
    wherein selecting the first cell according to the first core network type of the core network on which the connection needs to be performed comprises:
        selecting and indicating, at a non-access stratum (NAS) layer and to an access stratum (AS) layer, a second public land mobile network (PLMN) capable of supporting the first core network type according to the first core network type; and
        selecting, at the AS layer, the first cell from searched-out cells corresponding to the second PLMN.

2. The method according to claim 1, wherein the selecting, at the AS layer, the first cell from searched-out cells corresponding to the second PLMN comprises:
    selecting, at the AS layer, the first cell from the searched-out cells corresponding to the second PLMN according to a core network type supported by the searched-out cells corresponding to the second PLMN and the first core network type.

3. The method according to claim 2, wherein the method further comprises:
    obtaining, at the AS layer and from system information of the searched-out cells, the core network type supported by the searched-out cells; and
    transferring the obtained information to the NAS layer.

4. The method according to claim 1, wherein the selecting and indicating, at the NAS layer and to the AS layer, a second PLMN capable of supporting the first core network type according to the first core network type comprises:
    selecting and indicating, at the NAS layer and to the AS layer, the second PLMN from a PLMN list, wherein the PLMN list indicates a core network type supported by each PLMN.

5. The method according to claim 4, wherein the method further comprises:
    performing cell search at the AS layer, determining PLMNs corresponding to searched-out cells, and core network types supported by the PLMNs corresponding to the searched-out cells, and transferring the searched-out information to the NAS layer; and
    generating, at the NAS layer, the PLMN list according to the PLMNs corresponding to the searched-out cells, and the core network types supported by the PLMNs corresponding to the searched-out cells.

6. The method according to claim 5, wherein the method further comprises:
obtaining, at the AS layer and from the system information of the searched-out cells, the PLMNs corresponding to the searched-out cells, and the core network types supported by the PLMNs corresponding to the searched-out cells.

7. The method according to claim 4, wherein selecting and indicating, at the NAS layer and to the AS layer, a second PLMN capable of supporting the first core network type according to the first core network type comprises:
selecting a PLMN supporting the first core network type in the PLMN list as the second PLMN at least partially based on cell status information.

8. The method according to claim 1, wherein selecting and indicating, at the NAS layer and to the AS layer, a second PLMN capable of supporting the first core network type according to the first core network type comprises:
selecting, according to a priority of the first core network type supported by each PLMN, a PLMN corresponding to a low priority of the first core network type as the second PLMN.

9. The method according to claim 1, wherein the method further comprises: before selecting the first cell according to the first core network type of the core network on which the connection needs to be performed,
determining, at the NAS layer and according to a service type of a service that needs to be processed, a type of a core network on which a connection needs to be performed as the first core network type.

10. A terminal device, comprising:
a processor; and
a memory connected to the processor and storing instructions, wherein the processor, when executing the instructions, is configured to:
select a first cell according to a first core network type of a core network on which a connection needs to be performed, wherein the first cell is a cell supporting the first core network type; and
perform cell access through the first cell;
wherein the processor is specifically configured to:
select and indicate, at a non-access stratum (NAS) layer and to an access stratum (AS) layer, a second public land mobile network (PLMN) capable of supporting the first core network type according to the first core network type; and
select, at the AS layer, the first cell from searched-out cells corresponding to the second PLMN.

11. The device according to claim 10, wherein the processor is further configured to:
determine and indicate, at the NAS layer and to the AS layer, at least one of a first PLMN or a first radio access technology (RAT) that is selected for access; and
select, at the AS layer, the first cell from searched-out cells corresponding to the at least one of the first PLMN or the first RAT according to a core network type supported by the searched-out cells corresponding to the first core network type and the at least one of the first PLMN or the first RAT.

12. The device according to claim 11, wherein the processor is further configured to:
obtain, at the AS layer and from system information of the searched-out cells, the core network type supported by the searched-out cells; and
transfer the obtained core network type to the NAS layer.

13. The device according to claim 11, wherein the first core network type is indicated by the NAS layer to the AS layer.

14. The device according to claim 10, wherein the processor is further configured to:
select, at the AS layer, the first cell from the searched-out cells corresponding to the second PLMN according to a core network type supported by the searched-out cells corresponding to the second PLMN, and the first core network type.

15. The device according to claim 14, wherein the processor is further configured to:
obtain, at the AS layer and from system information of the searched-out cells, the core network type supported by the searched-out cells; and
transfer the obtained information to the NAS layer.

16. The device according to claim 14, wherein the processor is further configured to:
select and indicate, at the NAS layer and to the AS layer, the second PLMN from a PLMN list, wherein the PLMN list indicates a core network type supported by each PLMN.

17. The device according to claim 16, wherein the processor is further configured to:
perform cell search at the AS layer, determining PLMNs corresponding to searched-out cells, and core network types supported by the PLMNs corresponding to the searched-out cells, and transfer the searched-out information to the NAS layer; and
generate, at the NAS layer, the PLMN list according to the PLMNs corresponding to the searched-out cells, and the core network types supported by the PLMNs corresponding to the searched-out cells.

18. The device according to claim 17, wherein the processor is further configured to:
obtain, at the AS layer and from the system information of the searched-out cells, the PLMNs corresponding to the searched-out cells, and the core network types supported by the PLMNs corresponding to the searched-out cells, and transfer the information to the NAS layer.

19. The device according to claim 16, wherein the processor is further configured to:
select a PLMN supporting the first core network type in the PLMN list as the second PLMN at least partially based on cell status information.

20. The device according to claim 10, wherein the processor is further configured to:
determine, at the NAS layer and according to a service type of a service that needs to be processed, a type of a core network on which a connection needs to be performed as the first core network type.

\* \* \* \* \*